United States Patent Office 3,450,320
Patented June 17, 1969

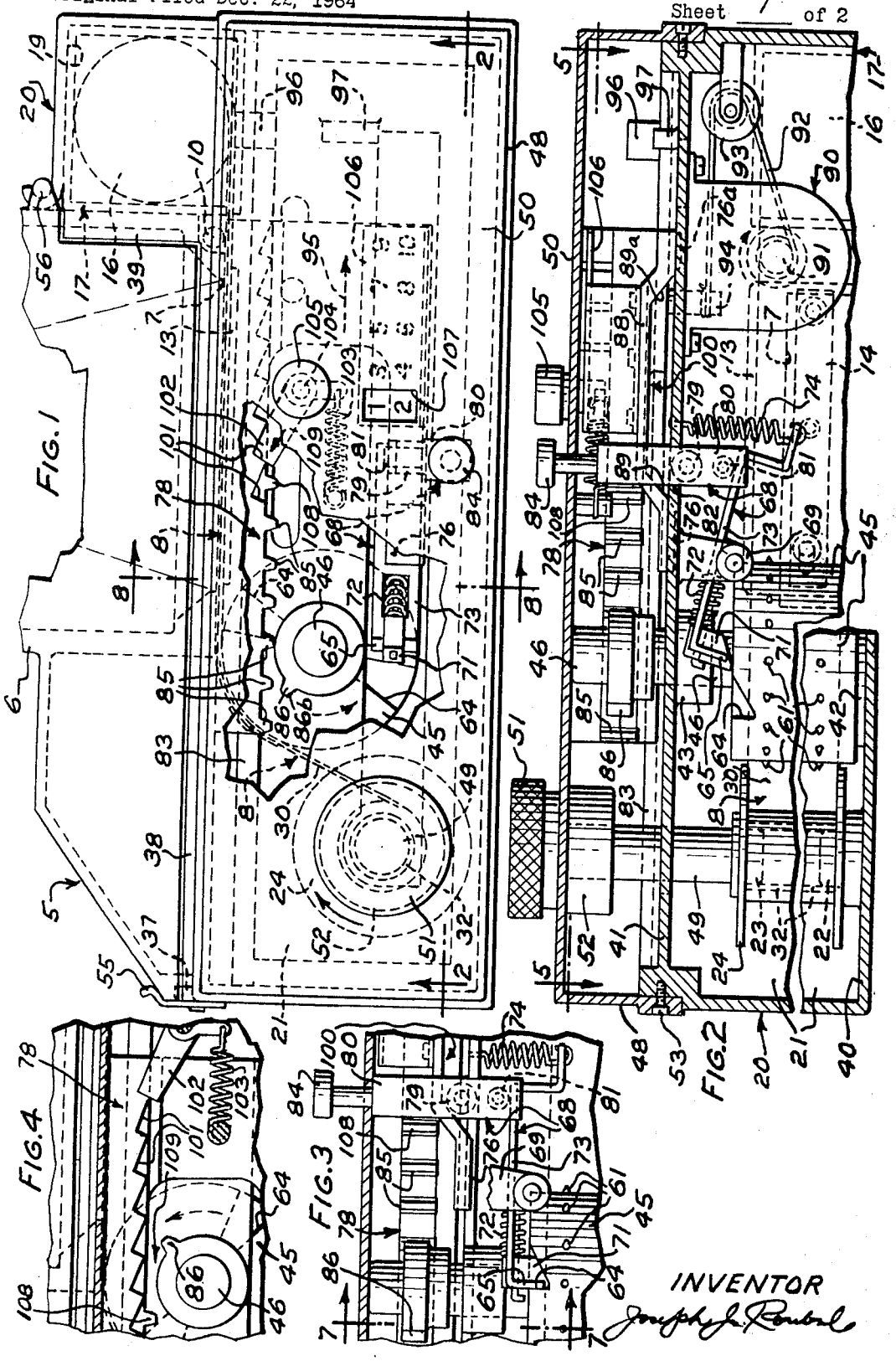

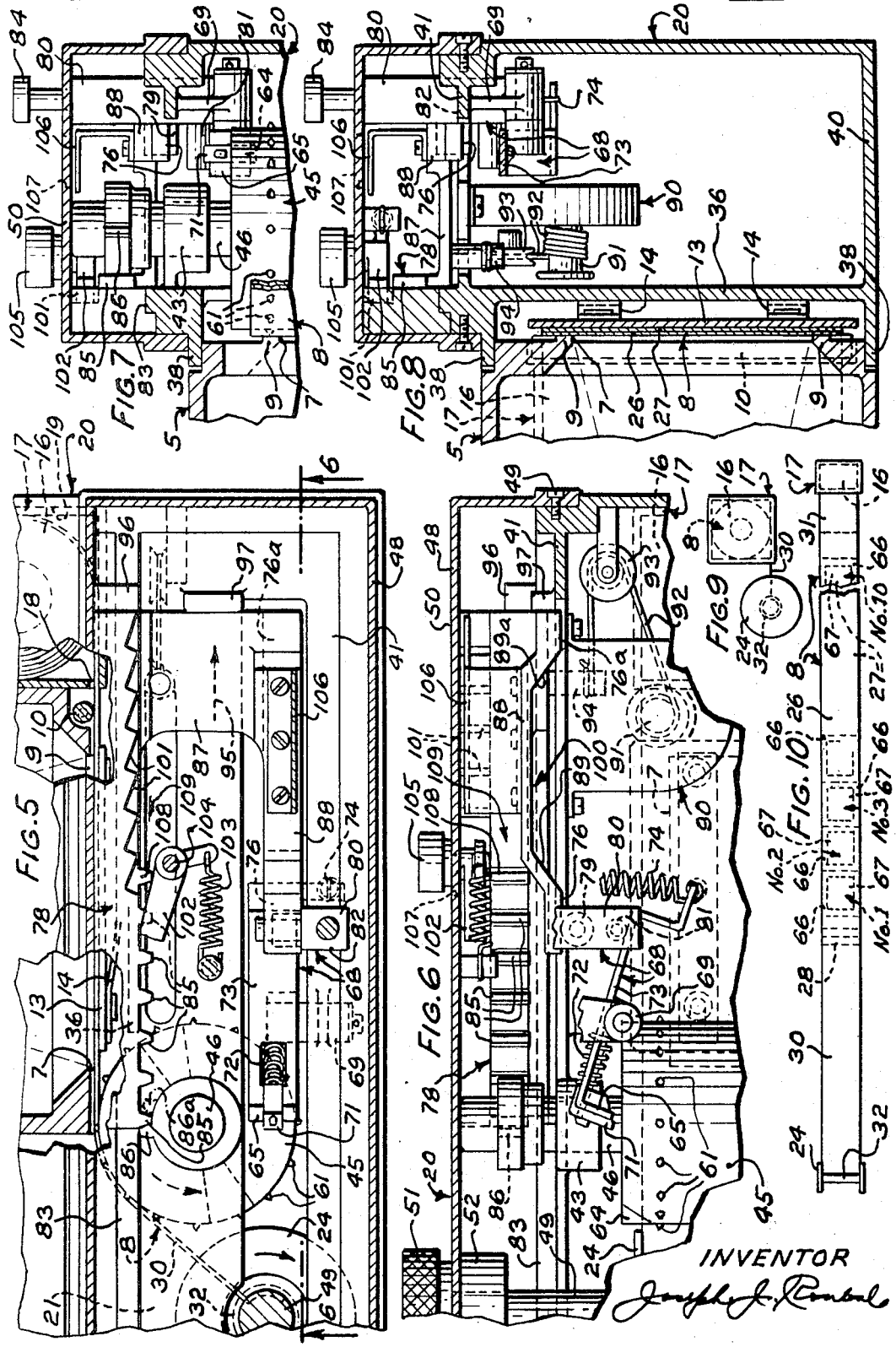

3,450,320
FILM CONTROL APPARATUS IN A CAMERA
Joseph J. Roubal, 5135 W. 22nd Place,
Cicero, Ill. 60650
Continuation of application Ser. No. 420,342, Dec. 22,
1964. This application Feb. 21, 1967, Ser. No. 635,631
Int. Cl. B65h 25/00
U.S. Cl. 226—46                    1 Claim

ABSTRACT OF THE DISCLOSURE

Apparatus in a camera in the winding and taking up operating to stop a backing paper carried photographic film in picture photographable portions and embodying means to permit a non-stop winding and taking up of the advanced paper portion and of the trailing paper portion of the backing paper carried photographic film.

---

This invention relates to photographic roll film cameras and more particularly to apparatus arranged in a camera for controlling a photographic film in winding, and this application is a continuation of my co-pending application, Ser. No. 420,342, filed Dec. 22, 1964, and now abandoned.

It is desirable, in the camera winding and taking up of a photographic film for the purpose of stopping the film in picture portions to be photographed, that, to this end, the control apparatus does not require visually readable designations printed as on the rear side of the film backing paper or that perforations in the film are utilized.

It is the object of the invention to provide control apparatus in a camera that operates permitting a non-stop winding and taking up of the advanced paper portion, and of the trailing paper portion, of a backing paper carried photographic film, and, also in the winding and taking up of the photographic film, which apparatus operates, thus, without printed indicia, perforations, or other control means carried by the film, to obtain successive stopping of the backing paper carried light sensitive strip in picture photographable portions.

The above and other objects in view are realized in practicing and use of the invention consisting of the novel construction, arrangement and combination of parts and features hereinafter more specifically described and illlustrated in the accompanying drawings, wherein is shown an embodiment of the invention, but it is understood that changes, variations and modifications can be made which fall within the scope of the claims hereunto appended.

In the drawings:

FIG. 1 is a plan view partly at top broken out showing the rear construction of a camera and which embodies the invention.

FIG. 2 is a section on 2—2 of FIG. 1.

FIG. 3 is a view of the film engaged roller in a stopped position.

FIG. 4 illustrates the film engaged roller being permitted to rotate freely to permit the film trailing paper to be taken up uninterruptedly in the take-up roll.

FIG. 5 is a section taken substantially on 5—5 of FIG. 2 and is a view similar to FIG. 1, but showing the apparatus immediately upon loading of the film.

FIG. 6 is a section on 6—6 of FIG. 5.

FIG. 7 is a section on line 7—7 of FIG. 3.

FIG. 8 is a section on line 8—8 of FIG. 1.

FIG. 9 is an end elevational view reduced in size of a film cartridge especially arranged for use in the apparatus.

FIG. 10 illustrates the film in expanded form.

In the drawings, the camera body 5, for the purpose of simplifying the description, is shown having the front 6 carrying the lens the shutter and the focusing and viewing devices omitted, it being understood, that a picture photographed by the lens passes through a picture defining window 7 to register in a photographic film 8. The window 7 is arranged at the rear of the body 5 in association of film rails 9, 9 and a freely rotatable roller 10 on which the film locates in the field of focus of the lens, and is flatly urged thereat by a presser plate 13 carried by resilient springs 14, 14.

It is seen, the film 8 is supplied by a coil 16 uncoiling from a cartridge 17. A narrow opening 18 (FIG. 5) permits pulling out the film. As is shown, the cartridge 17 is carried in a chamber 19 arranged in a rear body 20. Also a chamber 21 is arranged at the left. And bottom and top spool holders 22 and 23 (FIG. 2) in the chamber 21 provide to rotatably mount a film take-up spool 24 to take up the film 8, as will be described.

The film 8 is illustrated in expanded form in FIG. 10, and constitutes a backing paper 26 carrying a light sensitive strip 27 which, shown facing in the other direction in FIG. 10, is attached at the advanced terminal end by a paster 28, and thereby is available an advanced paper portion 30, and a trailing paper portion 31, of suitable lengths, respectively, to protect the light sensitive strip from light entry, in connection with the cartridge 17 when handled outside the camera, and when threading the film in the camera, and when upon being exposed the film is taken up in the take-up spool 24. The film 8 at a spindle 32 of the spool 24 has the paper 30 suitably attached, as is shown.

FIG. 9 shows the cartridge 17 having the film 8 fully coiled in the coil 16, and the take-up spool 24 in attachment of the paper portion 30 at the spindle 32 locates in adjacent proximity.

Now considering the rear body 20, it is seen, that therein a vertical wall 36 mounts the springs 14, 14 that carry the presser plate 13. End walls 37, 38, 39 in the rear body 20, as is shown, obtain a light tight separable connection at the camera body 5. Also a bottom wall 40 and a top wall 41 provide, as is shown in FIG. 2, journals 42 and 43 that mount for rotation a roller 45 being suitably fixed to a shaft 46. A cover 48 attached at 53 has an outside top wall 50. As is shown, further in FIG. 2, the bottom spool holder 22 is fixed at the wall 40, and the top spool holder 23, by means of an elongated shaft 49 fixed to a winder knob 51, is mounted for rotation in a unit 52. By rotating the knob 51, and which rotates the shaft 49 in the unit 52 in one direction and clockwise, as is indicated in FIG. 1, the spool 24 takes up the film, which more clearly will be described.

It is understood, the rear body 20 at the end walls 37, 38, 39, and due to a spring latch 55 and a hinge 56, is separable from the camera body 5, and when separated (not shown), it is understood, that, in the loading of the film, the spool 24 (thus in attachment of the cartridge 17 of the form shown in FIG. 9) may be mounted at the holders 22 and 23, which is obtained by an up and down manipulation (not shown) of the knob 51. Upon mounting the spool 24 in the holders, it will be seen, due to the attached paper portion 30 at the spool spindle 32, the cartridge 17 may be drawn letting out the paper portion so that in the first instance such passes over the roller 45, and that this paper portion passes extended over the presser plate 13, and therewith, in the loading of the film, as is here described, the cartridge 17 is placed to locate in the chamber 19.

The apparatus relies on the roller 45 at its periphery being engaged by the film 8. And the roller 45 will rotate when the film moves longitudinally in being wound and taken up in the roll of the spool 24. To obtain positive engagement between the film and the roller 45, pins 61 are fixedly anchored and carried at the roller periphery, and these pins penetratingly engage the film backing paper at the edges, as is shown.

In the present instance, as is shown, the roller 45 comprises an enlarged periphery, and due thereto, the roller incorporates two stop surfaces 64. And it is understood, in one revolution of the roller, when a tongue 65 is engaged twice by a stop surface 64, thereby stopping the roller twice, such, in the present instance, will obtain a stopping and proportioning in the sensitive strip 27 of the film 8 of two picture portions 66, as are to this end indicated in FIG. 10. The picture portions 66, it is understood, are substantially equal in length and each provides an area to contain a picture 67 that is photographed in the sensitive strip 27 by the camera lens at the picture defining window 7.

An operable mechanism designated 68 is arranged, and, it is seen (FIGS. 1 and 2), this has the tongue 65 locating in the path of rotation of a stop surface 64 of the roller 45. FIG. 3 shows the tongue 65 being engaged by a stop surface 64 and which causes a stopping of the roller. In this stop engagement, it is noted, that a lip 71, provided to slide relative the tongue 65, is moved slightly rearward. Upon momentary disengagement of the tongue 65 from the surface 64, as will be described, it is understood, the lip 71 by the action of a spring 72 moves ahead of the tongue 65, thus, to prevent the tongue at the instant surface 64 being re-engaged.

The tongue 65, in the operatable mechanism 68, is provided by a rocker 73 that is mounted for rocking by a support 69. A spring 74 urges the rocker at the tongue 65 to locate in the path of rotation of a stop surface 64, and thereby, when the roller 45 rotates, engagement is made by a stop surface 64 at the tongue 65, to cause the roller 45 to stop, as is described.

As will appear in the description of the operation of the apparatus, there obtains permitting a non-stop winding and taking up of the film 8, as concerns the advanced paper portion 30, taking place due to a surface 76, and, as concerns the trailing paper portion 31, taking place due to a surface 76a. The surfaces 76 and 76a are carried by a rack 78, as will more clearly be described. And, it will be seen, each surface 76 and 76a cooperates with the operatable mechanism 68 to obtain the tongue 65 from locating in the path of rotation of a stop surface 64 of the roller 45. To this end, in the construction, the operatable mechanism 68 includes a block 80 that carries a roller 79 and a pin 81. The block 80 is mounted for vertical movement in a slot 82 of the wall 41. As is shown, in FIG. 6, in this instance, the surface 76, by depressing the roller 79, depresses the block 80. Shown further is that the block 80, as such is depressed, and by means of the pin 81, causes a rocking of the rocker 73, and against the action of the spring 74, this causes a movement upwardly of the tongue 65. Thereby the tongue 65 is obtained from locating in the path of rotation of a stop surface 64 of the roller 45, as is described.

Arranged exteriorly of the cover 48 is a knob 84 carried top wise of a spindle that slides vertically in the cover wall 50. The spindle having the knob 84 is fixedly attached to the block 80.

It will be seen, in the above arrangement, the knob 84 is arranged to cooperate with the operatable mechanism 68, and, thus wherein, when the knob 84 is momentarily depressed—as in the position shown in FIG. 3—that thereby, in the operatable mechanism 68, the block 80 by means of the pin 81 will cause the rocker 73 to rock, such against the action of the spring 74, and thereby the rocker 73 at the tongue 65 will momentarily disengage from a surface 64 of the roller 45.

As will be described, the foregoing has special usefulness to the end of proportioning the picture portions 66 in the sensitive strip 27 of the film 8.

Considering now the rack 78, as is shown, such constitutes several teeth 85. The rack 78 operates at the front wall of the cover 48 guided by a rail 83 formed on the wall 41, and is thereby mounted to slide longitudinally. It will be seen, the rack is moved and driven in one direction due to the several teeth 85 and wherein in each revolution of the roller 45 each tooth alone is engaged by a projecting lug 86 fixedly attached to the shaft 46 of the roller 45.

Above has been mentioned that the surfaces 76 and 76a are carried by the rack 78. In the construction, it is seen, at the right end of the rack, a bifurcated extension 87 provides an arm 88 extending parallely as to the several teeth 85. The arm 88 at the fore end, as is shown, has the surface 76. Annexed to the surface 76 is a retreat surface 89 that provides at the underside of the arm 88 a free zone 100. A similar construction provides the surface 76a having a retreat surface 89a and is arranged in connection with the free zone 100 at the base end of the arm 88.

It is shown, in the present apparatus, the rack 78 returns automatically. To this end, a spring motor 90, mounted bottom wise at the wall 41, has a shaft 91 that in a clockwise direction, as is indicated, continuously winds a cord 92. This cord passing over a roller 93 and by attachment at 94, it is understood, normally continuously springingly pulls the rack in a direction indicated at 95 and which is opposite to the driving of this rack. A resilient member 96, to absorb shock caused by the spring return, and a stop surface 97, stop the rack in position as is shown in FIGS. 5 and 6.

While the device above described returns the rack, it is requisite that the rack remains moved and advanced upon being driven, as is described, in the one revolution by the roller projecting lug 86. To this end a clutch to clutch the rack 78 is provided. In the present instance, the clutch constitutes ratchet teeth 101 carried by the rack 78. A dog 102 is adapted to engage one ratchet tooth corresponding to the distance the rack moves and is advanced by the roller projecting lug 86. As is shown, the dog 102 is urged by a spring 103 to engage in the ratchet teeth. A relinquishing of the clutching on the rack, as will be described, is necessary and to this end the dog 102 is fixed to a shaft 104 mounted at the cover wall 50 and outside the cover has a knob 105.

Aiding in the operation of the apparatus, in connection with the camera, is a counting arrangement by means of which the stopped and proportioned film portions 66 may be numerically accounted for. For the purpose, an upright panel 106 is suitably fixed at the top side of the arm 88. As is shown in FIG. 1, the panel 106 provides a printed side by side form of double numerals 1/2, 3/4, etc. The double numerals will appear at a window 107, which more clearly will be considered.

There will now be described the controlling of the film 8, as takes place in the loading, and thereupon as involves: (1) the non-stop winding and taking up of the film advanced paper portion 30; (2) the stopping and proportioning in the strip 27 of the picture portions 66; and, (3) upon photographing in the strip 27 of the pictures, the non-stop winding and taking up of the trailing paper portion 31.

It should be understood, that, as is obtained in the loading of the film, the paper 30 in attachment of the spindle 32 of the take-up spool 24 without forming a roll, as is shown in FIG. 5, is maintained preferably fully extended. Also, obtained in the loading of the film, and shown in FIG. 5, is that, the roller 45 is stopped in a clockwise direction, and that because of this, the roller projecting lug 86 abuts at the front side of the first tooth of the rack several teeth 85.

By initially stopping (and as such, starting) the roller 45 wherein the projecting lug 86 abuts at the front side of the first tooth of the teeth 85, it will be seen that thereby, almost a complete revolution, in rotating from starting, by the roller 45 is realized, therewith, as is indicated at 86a (FIG. 5), that the projecting lug will commence to move the rack 78 at the rear side of the first tooth of the several teeth 85—and this is an advantage, in that, an initial relatively longer length of the paper 30, as engages the roller periphery, is at once allowed to be taken up in the spool 24, and this will appear in the description now following.

Assuming now that, as is described, after loading the film, the rear body is closed and in normal attachment at the camera body 5, as is shown in FIGS. 5 and 6, the film may be wound and taken up in the spool 24 by turning the knob 51 clockwise, as is described, and therewith moving of the film will result, and since the film here in the paper 30 is engaged at the roller periphery by the pins 60 such will rotate the roller 45.

As has been described, and shown in FIGS. 5 and 6, the rack carried surface 76 by cooperating with the operatable mechanism 68 obtains the tongue 65 from locating in the path of rotation of a stop surface 64 of the roller 45. And, due to this, taking place here, as is described, in the winding of the film paper 30, it will be seen, the roller 45 will rotate uninterruptedly, and this roller will rotate almost a complete revolution (as is described from starting) until at 86a (FIG. 5) whereat the projecting lug, by engaging the rear side of the first tooth of the several teeth 85, will commence to move the rack 78. And at this instant, by the winding and taking up of the paper 30 in the roll of the take-up spool 24, it will be seen, almost a full roller peripheral length of the film will be taken up, and which therewith advances an equivalent length of the film in the paper 30 from the coil of the cartridge 17 at the rails 9, 9 and window 7.

And, it is understood, in the continuation of the winding and taking up the film by turning the knob 51, and wherein the roller 45 continues to rotate, that thereby the projecting lug 86 will at the rear side engage the first tooth of the several teeth 85, and in the progressing rotation of the roller and lug 86, such will cause the rack 78 to be driven and advanced in one direction, thus, a distance equal to the rotation of the projecting lug (not shown, but seen in conjunction with FIG. 1), and at which time, it should be seen, the clutching mechanism in the dog 102 will engage one ratchet tooth 101, thereby maintaining the rack in the one direction against the spring pulling of the cord 92 of the spring motor 90, as is described.

Forthwith, it should be understood, a second revolution of the roller 45 immediately proceeds wherein the film, by peripherally engaging the roller, is therewith taken up in the spool 24 by the continuous turning of the knob 51, And, as rotating with the roller, when the projecting lug 86 engages the rear side of the second tooth of the rack teeth 85, it will be seen, in this instance, a full roller periphery will further advance a length equivalent thereto of the film in the paper 30 to bring forward from the cartridge 17, at the rails 9, 9 and window 7, the sensitive strip 27.

Now, the starting of the third revolution of the roller 45 is here considered, and it will be seen, by the moving of the projecting lug 86 and the lug driving the second tooth of the teeth 85, the rack will be moved in the one direction, and therewith this rack will be stopped in a position as is shown in FIG. 1, here illustrating the lug 86 at a position 86b. And shown therewith in FIG. 2, is the rack 78 having the surface 76 correspondingly moved and advanced, and showing that the roller 79 (here being free of the surface 76) now occupies the free zone 100, and thereby, it is seen, that the operatable mechanism 68 has operated to normally locate the tongue 65 in the path of rotation of the stop surface 64 of the roller 45.

In the advancing of the rack, above described, it is understood, the clutching mechanism in the dog 102 engages a ratchet tooth 101 to maintain the rack in the one direction against the pulling of the cord 92, as is described.

A normal taking up of the film by turning the knob 51 is here continued, and the roller 45 will continue to rotate, and since, as is described, the tongue locates in the path of rotation of a stop surface 64 of the roller 45, herewith, as from the position shown in FIGS. 1 and 2, only a further small rotation of the roller 45 will bring the stop surface 64 in position to engage of the tongue 65, and this tongue by the rocking of the rocker 73 and action of the spring 74 will enter and become engaged by a stop surface 64, as is shown in FIG. 3, and which causes therewith that the roller 45 is stopped and that the film as such moves is stopped, this being recognized by the operator's fingers in a difficulty to further rotate the knob 51.

Described above is the upright panel 106 being carried by the rack 78, and as concerns the stopping of the rack in the position shown in FIGS. 1 and 2, it is seen, that thereby the panel 106 is stopped wherein the double numeral 1/2 appears at the window 107.

Considering said difficulty to further rotate the knob 51, the operator is advised that the film paper 30 has been substantially taken up in the spool 24, that the paper carried strip 27 is at the rails 9, 9 and window 7, and by the presence at the window 107 of the numeral 1/2 such as visually noted.

Upon occurrence of the foregoing, in exposing the camera, a No. 1 picture will be photographed in the strip 27 to form the first picture portion 66. And proceeding therewith, an unexposed film is desired for photographing the second picture.

To this end, by a momentary depressing of the knob 84, the tongue 65 against the action of the spring 74 is disengaged at the roller stop surface 64, and here the lip 71 at the stop surface prevents the tongue from reengaging.

And therewith the taking up of the film by turning the knob 51 is resumed, and in the present instance, only a half revolution by the roller 45 causes a stop surface 64 to engage the tongue 65, and by the action of the spring 74, the stop engagement is assured, and thereby the roller 45 is stopped, and the film that moves the roller is stopped—such again being recognized by the operator's fingers in a difficulty to further rotate the knob 51. And, it is understood, as is described, due to the periphery of the roller 45 and second stopping of this roller, the film in the strip 27 here has been proportioned for the No. 1 picture portion 66 which, as is described, is herewith in course of being taken up in the spool 24.

It is the purpose of the apparatus to stop and proportion a total of ten (10) portions 66 to contain ten (10) photographed pictures in the strip 27.

It will be seen, in a repetitive operation wherein, in each instance, after exposing the film, the knob 84 is momentarily depressed, and therewith the film is wound by turning the knob 51 until a difficulty in further winding and rotation is recognized by the operator's fingers, that, in a manner as has been hereinabove described, the said total of ten (10) portions 66 will be stopped and proportioned, and as concerns the last portion in a picture No. 10, such will be indicated at the window 107 by the numeral 9/10.

And upon photographing the sensitive strip to contain a picture No. 10, it is desirable, that, the trailing paper portion 31, which as here described, still extends coiled substantially in the cartridge 17, be taken up in the spool 24 so that when this spool is removed from the camera the sensitive strip is protected from light entry.

To this end, it is understood, the like momentary depressing of the knob 84, as has been described, is required, and therewith is required a turning of the knob 51 to wind and take up the film in the spool 24.

Attention is directed, as concerns this trailing paper winding and taking up, to the surface 76a being carried, as is described, at the base end of the arm 88 by the rack 78. It will be understood, in a further rotation and driving by the roller projecting lug 86 that engages a tooth 108, arranged similarly as the teeth 85, will obtain a further driving of the rack 78 in the one direction, and this rack by means of the surface 76a will cause a depressing of the roller 79 and therewith of the block 80 in the operatable mechanism 68, and which is obtained, in a similar manner, showing this condition in FIG. 6, as being obtained by the surface 76. And in a similar manner, as is shown in FIG. 6, the tongue 65 will be obtained from locating in the path of rotation of a stop surface 64 of the roller 45, and therewith (see FIG. 4), due to a free space 109 being arranged after the tooth 108, and in which free space 109 the projecting lug 86 is allowed freedom of rotation, it will be seen, that, the film trailing paper portion 31 leaving the cartridge 17 on the rails 9, 9 and peripherally engaging the roller 45 will be taken up uninterruptedly and completely in the take-up spool 24.

Upon the complete taking up of the film, it will be seen, the rack 78 will be fully moved in the one direction, which in the cover 48 will be at the left. To bring the rack into the position shown in FIGS. 5 and 6, such is obtained, preferably by holding the knob 84 down so that the roller 45 is free to rotate, and, it will be seen, a turn of the knob 105 will move the dog 102 to relinquish the ratchet teeth, and therewith by the spring pull of the cord 92, the rack 78 will return stopping at the stop surface 97, as has been described.

It is understood, in the opening of the camera, the fully coiled take-up spool 24 is available for removal from the holders 22 and 23 in the chamber 21.

What I claim is:

1. In a camera for controlling a photographic film, a rotatably mounted roller adapted peripherally to engage a photographic film and in the moving of the photographic film which said roller will rotate, and said rotatably mounted roller having a stop surface that rotates with the roller, and said rotatably mounted roller having a projecting lug that rotates with the roller, operatable means constituting a tongue, said operatable means having the tongue normally locating in the path of rotation of said roller stop surface and when the roller is rotated by the peripherally engaging and moving photographic film whereby said roller stop surface engages the tongue and thereby is obtained a stopping of the roller and a stopping of the photographic film, means cooperating with said operatable means and being operative to cause a momentary disengagement of the tongue when engaging at said roller stop surface, and rack means having several teeth, said rack means being mounted to slide longitudinally and said rack means being movable and driven in one direction by said roller projecting lug as this projecting lug rotatably moves in each revolution of said roller and wherein the roller projecting lug engages alone each tooth of said rack means, and said rack means carrying means that in cooperation with said operatable means obtains said tongue from locating in the path of rotation of said roller stop surface.

References Cited

UNITED STATES PATENTS

| 1,535,930 | 4/1925 | MacDonald | 95—31 |
| 1,997,332 | 4/1935 | Green | 95—31 |
| 2,621,866 | 12/1952 | Harvey | 242—71.4 |
| 2,652,209 | 9/1953 | Hodges | 242—71.4 |
| 2,728,281 | 12/1955 | Mihalyi | 242—71.4 |
| 3,019,697 | 2/1962 | Lindau | 95—31 |
| 3,186,322 | 6/1965 | Beach | 95—31 |

WALTER SOBIN, *Primary Examiner.*

U.S. Cl. X.R.

226—56, 57, 58, 130, 134, 145